2,786,040

EMULSION PAINTS

Joachim Dazzi, Dayton, Ohio, assignor to Monsanto Chemical Company, St. Louis, Mo., a corporation of Delaware No Drawing. Application April 13, 1953, Serial No. 348,571

7 Claims. (Cl. 260—29.6)

This invention relates to emulsion paints. In a particular aspect the invention relates to new plasticizers for polystyrene-type water-base emulsion paints.

The introduction of polystyrene and styrene copolymer emulsions as raw materials for the paint industry has resulted in new high standards of performance in the field of water paints. This improved performance extends the use of aqueous systems in both architectural and industrial finishes. To date, those emulsions receiving particular attention include the styrene-butadiene copolymer, pre-plasticized polystyrene, and post-plasticized polystyrene, which can be defined as polystyrene plasticized after it has been polymerized in an aqueous medium. The present invention is particularly applicable to post-plasticized polystyrene emulsions, but is also applicable to the other types.

Early attempts to use high molecular weight polystyrene in surface coatings employed the approach of solution in a suitable solvent along with plasticizer to yield a film by evaporation of the solvent. Unfortunately, polystyrene proves a difficult material to plasticize and the films were subject to severe crazing and poor adhesion. In addition, the solutions exhibited high viscosity at low solids content and a tendency to web during spraying. These drawbacks coupled with the incompatibility of polystyrene with conventional film-forming resins prevented its general acceptance as a solution coating resins until styrene was introduced in a modification with oils or alkyds, or as a copolymer with butadiene or other unsaturated materials. It was found, however, that by plasticizing polystyrene while in emulsion form, the drawbacks of poor application, film crazing and poor adhesion could be overcome and a high quality emulsion could result.

It is generally most convenient for paint formulators to introduce plasticizer during preparation of the finished emulsion paint. This allows flexibility in making formulations for any particular purpose. The requirements for plasticizers to be used in polystyrene emulsion surface coatings are rather strict. Thus, the plasticizer must be a liquid at room temperature, must be compatible with the polystyrene and any solvents used, must be a solvent for polystyrene itself, and must be emulsifiable. A standard test for plasticizers for polystyrene for use in this application is that of determining the gel time. In this test, two parts by weight of the proposed plasticizer is placed in an open vessel at room temperature. One part by weight of dry powdered polystyrene of a type suitable for use in emulsion paints, preferably prepared by spray drying of a polystyrene emulsion made by emulsion polymerization of styrene, is added while the mixture is vigorously stirred. The gel time is taken as the time elapsed between addition of polystyrene and the point just preceding complete gelation.

The gel time of a particular material may be read differently by different operators, but a single operator testing a series of materials arrives at values for those different materials that are consistent with each other. It is therefore customary to determine the gel time on a standard compound to give a reference point for determining point of gelation and thereby maintain as nearly as possible consistency between operators and between tests by the same operator made at different times. The shorter the gel time the better the plasticizer for the intended use. Those plasticizers having long gel times are less suitable because of their lack of ability to penetrate and dissolve polystyrene.

The essence of the present invention lies in my discovery that normally liquid alkylated polycyclic aryl compositions, including single compounds and mixtures of compounds, are highly satisfactory for use as plasticizers in polystyrene-type emulsion surface coatings. My plasticizers are employed in amounts which generally are in the range of approximately the same weight as the weight of the polystyrene solids used in the emulsion product. Most emulsion surface coating formulations of the polystyrene type will contain from 0.25 to 2 parts liquid alkylated polycyclic aryl compositions per 1 part polystyrene by weight. While the polystyrene and plasticizer can be admixed prior to formation of the emulsion, it is preferred to prepare an emulsion of polystyrene by the emulsion polymerization of styrene monomer, with or without other copolymerizable ethylenically unsaturated comonomers, and then to admix said polystyrene emulsion with the plasticizer. Various suitable methods of preparing the final formulation are described hereinafter.

The alkylated polycyclic aryl compositions employed as plasticizers in the present invention may be single compounds, or mixtures of compounds. Only those compositions that are normally liquid, i. e., liquid at temperatures usually considered room temperature, for example, liquid at 30° C. and preferably liquid at 20° C., are encompassed within the invention. Some alkyl polycyclic aryl compounds are sufficiently low melting to come within this definition. Others have melting points higher than the requirement, yet mixtures of same with other alkylated polycyclic aryl compounds are normally liquid. Therefore, the invention includes the use of normally liquid mixtures of alkyl polycyclic aryl compounds. Particularly useful are mixed isomeric alkyl substituted polycyclic aryl compounds.

My plasticizers are advantageous in that they are high boiling and therefore serve as permanent plasticizers in the surface coating. Of particular interest are those compounds, normally liquid or forming with other such compounds normally liquid compositions, that contain the biphenyl nucleus. For example, monoisopropylbiphenyl and diisopropylbiphenyl are excellent materials to employ in practicing the present invention. Likewise, alkyl naphthalene derivatives, so long as they meet the stated requirements, are preferred materials for use in the invention. Monoamylnaphthalene, for example, is eminently satisfactory, having a gel time of less than 2 minutes at room temperature, whereas diamylnaphthalene has a gel time of 10 minutes and the gel test must be run at 50° C., so that diamylnaphthalene finds usefulness in the invention only in mixtures with other alkyl polycyclic aryl compounds, where said mixtures are normally liquid. Alkylated triphenyls can also be used in practicing the invention. The polycyclic aryl compounds in question can contain one or more alkyl groups. Preferably the alkyl group or groups contain from 1 to 8 carbon atoms per alkyl group. The mono- and dialkyl compounds are usually preferred, although compounds containing more than 2 alkyl groups are also considered to be within the scope of the invention provided they are normally liquid or form normally liquid mixtures with other alkylated polycyclic aryl compounds. Compounds containing two or three rings, at least one of which must be aryl, and which may or may not contain fused rings, are preferred.

The alkylated polycyclic aryl compounds can readily be made by Friedel-Crafts catalyzed alkylation of polycyclic aryl compounds. For example, a mixture of ethylated biphenyl compounds can be prepared by reacting, at 75° C., molten biphenyl containing aluminum chloride catalyst with ethylene passed into the mixture in the form of a gas. Preferably the product is treated with dilute hydrochloric acid to remove aluminum chloride, washed with water, dried, and distilled to separate the ethylated product from unreacted biphenyl. Fractions of desired characteristics can be obtained. Thus, a fraction boiling in the neighborhood of 300° C. is a suitable normally liquid plasticizer for practicing the present invention. Other alkylating agents than olefins, for example, alkyl halides, alcohols, etc. can be employed by methods well-known to those skilled in the art. Similarly other alkylating catalysts than aluminum chloride, for example, hydrofluoric acid, can be used under suitable conditions.

The starting material to be alkylated can be an unsubstituted diphenyl, naphthalene, triphenyl or the like, or can already contain one or more alkyl substituents, depending upon the source of this starting material. Of course, those polycyclic aryl compounds containing one or more alkyl groups derived from sources other than alkylation can be employed as plasticizers without further alkylation, provided they meet the stated requirements with respect to being normally liquid or forming mixtures that are normally liquid. Further, the polycyclic nuclei of my plasticizers can contain chlorine or other halogen groups or can be partially hydrogenated. Thus, the invention includes the use of normally liquid compositions comprising alkyl tetrahydronaphthalenes, alkyl partially hydrogenated biphenyls, and the like. Suitable starting materials to be alkylated to form plasticizers for the present invention include biphenyl prepared by the pyrolytic conversion of benzene and products of said pyrolytic conversion that are higher boiling than biphenyl. Alkyl groups in the plasticizers of this invention can be methyl, ethyl, n-propyl, isopropyl, n-butyl, isobutyl, sec.-butyl, tert.-butyl, the various amyl, hexyl, etc. alkyl groups ordinarily derived from corresponding olefins, alkyl halides, etc.

The invention is particularly applicable to aqueous emulsions of polystyrene per se, i. e., polymer obtained by the homopolymerization of styrene monomer. However, it is also applicable to polystyrene materials obtained by the copolymerization of styrene with other monomeric materials, e. g., vinyl chloride, vinyl acetate, diolefins such as 1,3-butadiene, acrylonitrile, α-methylstyrene, vinyltoluene, and various of the numerous other ethylenically unsaturated monomers copolymerizable with styrene as well understood by those skilled in the art. For best results the copolymer contains at least 50 weight percent styrene, and preferably from 70 to 80 percent styrene or more. The amount of comonomer that can be used successfully will of course be dependent on the particular comonomer chosen. The term "styrene polymer," as used herein encompasses both the homopolymers of styrene and copolymers of styrene. When polystyrene is mentioned, it will be understood to be exemplary of styrene polymers. Vinyltoluene and/or α-methylstyrene can be substituted for part or all of the styrene in polymers made as described herein.

While polystyrene can be prepared by methods other than emulsion polymerization, followed by the preparation of an emulsion of the same, this is seldom satisfactory and it is much preferred that the polymerization be effected by suitable emulsion polymerization techniques. Such techniques are so well-known in the art that it is deemed unnecessary to recite some in detail here. Due consideration will be given to the use of emulsifying agents and other conditions of emulsification and polymerization that will result in finished emulsion base surface coatings having good freeze-thaw stability, aging characteristics, and the numerous other characteristics that are desirable in a product of this nature.

By way of illustration suitable formulation techniques are set forth in Table I below:

TABLE I

| Pigmented | Non-Pigmented |
| --- | --- |
| 1. Pigment, Emulsifying Resin and Water—Stir 30'. | 1. Emulsifying resin and water—Stir slowly 15'. |
| 2. GRM and NH₄OH—Stir 15' in mixer. | 2. GMR and NH₄OH—Stir slowly 15'. |
| 3. Plasticizer—Stir 1 hr. in mixer. | 3. Plasticizer—Stir 1 hr.—high speed. |
| 4. Water and Polystyrene Emulsion—Stir 1-3 hrs. in mixer. | 4. Polystyrene Emulsion—Stir 3' high speed. |
| 5. Wetting Agent and Thickener—Stir 10' in mixer. | 5. Water, Defoamer and Wetting Agent—Stir 10'. |

GMR = glycerol monoricinoleate as defoamer.

In Table I, the finishes are classified into two types, pigmented, and non-pigmented. This is done because the equipment required to process these finishes also falls into two classifications. In the case of pigmented finishes, it is found that conventional slow-speed mixing equipment, i. e., a change can pony mixer, a dough mixer, or a Hobart mixer would provide adequate stirring to yield an interior flat or egg shell finish and no grinding of the pigment is required. In the case of non-pigmented finishes, high speed stirring equipment, i. e., an Eppenbach homogenizer, a Lightning mixer or other high speed stirrers are required in order to arrive at the desired result. It is thought that this difference is due to the increased efficiency of the emulsifier due to the greatly increased surface area contributed by the pigment.

A suitable sequence of events is:

a. The formation of the emulsifier.

b. The emulsification of the plasticizer.

c. The introduction of polystyrene dispersion and continued stirring until the polystyrene dissolves in the plasticizer.

The formation of the emulsifier takes place in Steps 1 and 2 in Table I wherein the emulsifying resin and water with or without pigment is stirred and ammonia is added to form the ammonium salt of the emulsifying resin. A suitable emulsifier is the ammonium salt of an alkali-soluble sulfonated polystyrene resin. Other emulsifiers are chosen in accordance with the over-all formulation and use to which it is to be put. The plasticizer is emulsified in step 3 by stirring in the presence of the emulsifying agent. The solution of the polystyrene particles in plasticizers takes place in step 4. Step 5 wherein the wetting agent and thickener is introduced is not essential and is only employed when the specific formulation requires it.

Pigments should be selected from those possessing good alkali resistance and little or no water-soluble salts, particularly those contributing divalent cations. When pigments are employed they can be included in the initial charge and dispersed in the aqueous emulsifier during its formation. In the case of very high pigment loading, part of the pigment should be held out and added after completion of the vehicle. This is found particularly necessary in the case of highly adsorptive pigments in order to prevent adsorption of the plasticizer and a lowering of its ability to dissolve the polystyrene. Care should be exercised in pigment selection since some pigments retard emulsification of the plasticizer and thus prevent proper solution of the polystyrene.

The function of the plasticizer is to dissolve the many particles of polystyrene introduced as a dispersion. Upon the addition of the polystyrene dispersion, the mixture contains two internal phases neither of which is a film-former. Polystyrene particles are hard and have no adhesiveness toward each other, toward surfaces, or toward pigments. However, a suitable solution of polystyrene in plasticizer is a film-former that can be tacky or non-tacky depending upon the relative amounts of the constituents employed. The goal in this process is to arrive at complete solution of the polystyrene in the plasticizer and for this reason the plasticizer is first emulsified. This step provides a great number of small droplets of plasticizer which can contact the many particles of polystyrene to result in rapid solution.

In order for a plasticizer to perform the above function, it must be compatible with, and a solvent for, polystyrene, it must be fluid at room temperature, it must be present in sufficient volume to dissolve the polystyrene present, and it must be emulsifiable. If a plasticizer lacks any one of the first three properties the effect is similar and the result is a fragile film having poor strength and adhesion since the polystyrene particles and plasticizer particles are not united. When the plasticizer is present in insufficient volume to dissolve all the polystyrene, optimum use of the polystyrene is not obtained. However, certain applications might demand a low plasticizer content in order to obtain sufficient film hardness and both conditions can be satisfied by employing a fugitive plasticizer or solvent, for example, a high-flash naphtha, along with the plasticizer. After the solvent performs its function of aiding in the solution of the polystyrene, it is no longer needed and it leaves the film during drying.

After the plasticizer is emulsified, the dispersion is added at a moderate rate at a point where the stirring will rapidly carry it into the batch. This method prevents lump formation and avoids wasted stirring effort to disperse such lumps. In the case of high-speed mixers with close tolerance bearings or shear surfaces, care should be exercised to insure that the dispersion is carried into the batch before it enters such equipment. This precaution prevents breaking of the dispersion and consequent freezing of the bearings. As soon as the dispersion is carried into the batch however the system is mechanically stable and will withstand severe mechanical action.

Wetting agents should be included near the completion of the batch since earlier additions can increase foaming during the stirring cycle.

The use of thickeners is required in some finishes to provide adequate application viscosity. Both methyl cellulose and sodium polyacrylate are found suitable. As a general rule a thickener that requires minimum water for its introduction provides greatest flexibility in viscosity adjustment.

Tinting may be accomplished by employing suitable pigments ground in water-soluble resin. The use of the water-dispersible organic colors also provides a simple method of tinting requiring only stirring of the color in water prior to tinting.

Those skilled in the paint formulation art will readily be able to choose suitable proportions of the various components to give clear, white or pigmented emulsion-based surface coatings suitable for the numerous applications for this type of finish. By way of example a number of different types of formulation, wherein the plasticizers of the present invention can be used in place of the plasticizers mentioned therein, reference is made to the article by F. J. Hahn in American Paint Journal, 35, No. 39, June 18, 1951, pages 58 et seq.

Gel times

Gel times of a number of plasticizers were determined in the manner described hereinabove, employing two parts by weight plasticizer and one part by weight polystyrene resin. The data are presented in Table II:

TABLE II

| Plasticixer | Gel Time, Room Temp. | Gel Time, 50° C. | Gel Time, 80° C. | Gel Time, 100° C. |
| --- | --- | --- | --- | --- |
| Branched dodecylbenzene | 2 hrs | | | |
| Partially hydrogenated terphenyl | 30 min | | | |
| Diisopropylbiphenyl | 7 min | | | |
| Isopropylbiphenyl | 2 min | | | |
| Monoamylnaphthalene | 1 min., 18 sec. | | | |
| Diamylnaphthalene | | 10 min. | | |
| Biphenyl | | | 1 min., 30 sec. | |
| o-Diphenylbenzene | | | immediately. | |
| m-Diphenylbenzene | | | | immediately. |

It will be noticed in the foregoing that the last three compounds tested, which are unsubstituted di- and triphenyl compounds, are far too high melting to be satisfactory plasticizers for the polystyrene type emulsion surface coatings. The first material in the above table, which is branched dodecylbenzene, is normally liquid and is an alkylated aromatic hydrocarbon, but has a very long gel time. Also, the second material in the above table, which is partially hydrogenated terphenyl, is normally liquid but has a long gel time; this material has been used extensively as a plasticizer in polystyrene-type emulsion paint. It is seen that isopropylbiphenyl and monoamylnaphthalene are both excellently adapted for use as plasticizers as stated herein. Likewise, diisopropylbiphenyl has a sufficiently short gel time (7 minutes) to be a good material; various other evaluation tests on diisopropylbiphenyl show it to be highly satisfactory from an all-round viewpoint. The diamylnaphthalene, although having a gel time of 10 minutes at 50° C. and being too high melting for practical value as a plasticizer alone, is useful when in admixture with other alkylated polycyclic aryl hydrocarbons of such nature and such proportions that the mixture is normally liquid.

While the invention has been described herein with particular reference to various preferred embodiments thereof, it will be appreciated that variations from the details given herein can be effected without departing from the invention in its broadest aspect.

I claim:

1. An emulsion surface coating composition comprising water and styrene polymer and containing as plasticizer a compound selected from the group consisting of isopropylbiphenyl and diisopropylbiphenyl.

2. An emulsion surface coating composition according to claim 1 wherein said styrene polymer is a copolymer of styrene with an ethylenically unsaturated comonomer.

3. An emulsion surface coating composition according to claim 2 wherein said comonomer is butadiene.

4. An emulsion surface coating composition comprising water and emulsion-polymerized styrene polymer and containing as plasticizer diisopropylbiphenyl.

5. An emulsion surface coating composition comprising water and emulsion-polymerized styrene polymer and containing as plasticizer isopropylbiphenyl.

6. An emulsion surface coating composition according to claim 1, wherein said styrene polymer is a homopolymer of styrene.

7. An emulsion surface coating composition comprising water, an emulsifying agent, styrene polymer, and as plasticizer from 0.25 to 2 parts by weight per 1 part styrene polymer of a compound selected from the group consisting of isopropylbiphenyl and diisopropylbiphenyl.

References Cited in the file of this patent

UNITED STATES PATENTS

| 2,545,702 | Norris | Mar. 20, 1951 |

FOREIGN PATENTS

| 506,290 | Great Britain | May 25, 1939 |
| 579,242 | Great Britain | July 29, 1946 |